W. MILLS.
MOLDING MACHINE.
APPLICATION FILED MAR. 14, 1913.
1,122,528.
Patented Dec. 29, 1914.
2 SHEETS—SHEET 1.
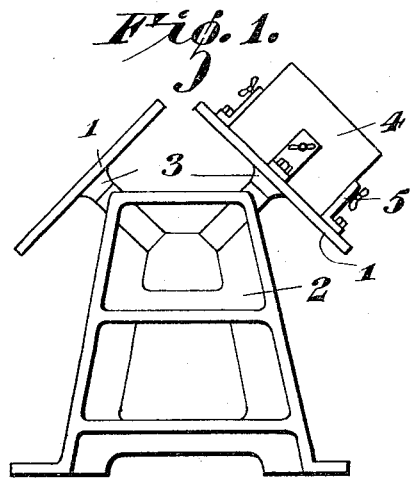
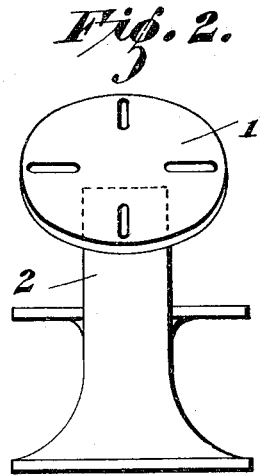
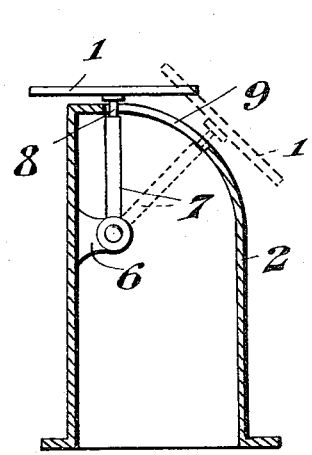
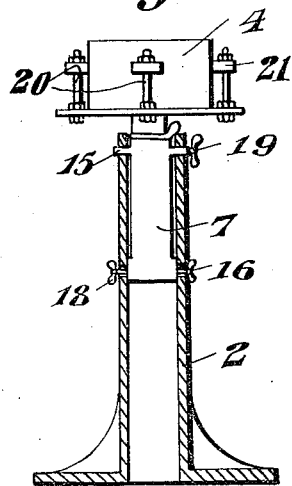

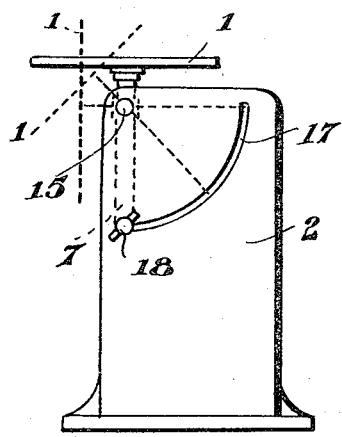
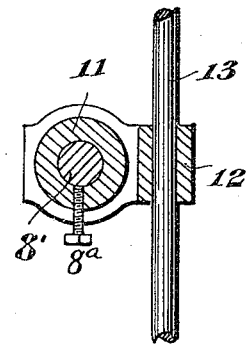
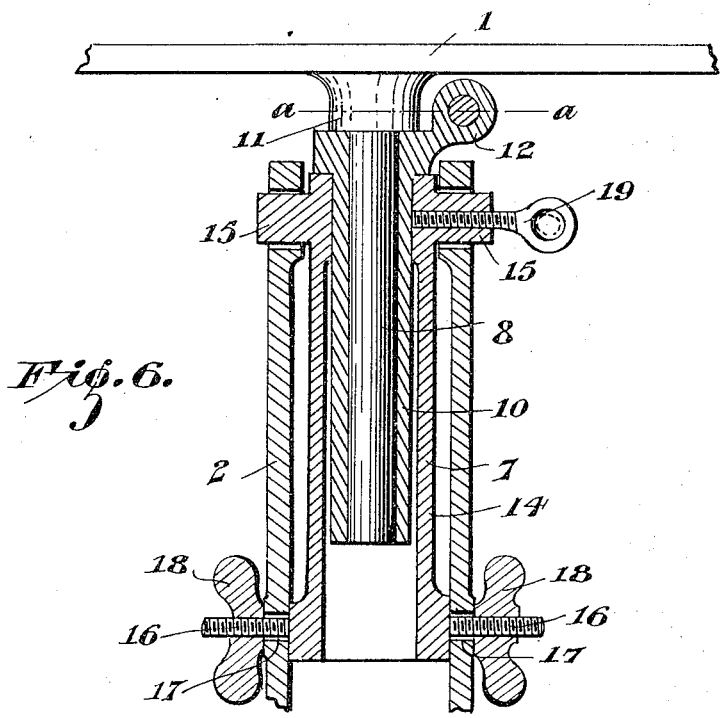

UNITED STATES PATENT OFFICE.

WILLIAM MILLS, OF BIRMINGHAM, ENGLAND.

MOLDING-MACHINE.

1,122,528.  Specification of Letters Patent.  Patented Dec. 29, 1914.

Application filed March 14, 1913. Serial No. 754,336.

*To all whom it may concern:*

Be it known that I, WILLIAM MILLS, a subject of the Kingdom of Great Britain, residing at Atlas Aluminium Works, Grove street, Birmingham, in the county of Warwick, England, have invented certain new and useful Improvements in Molding-Machines, of which the following is a specification.

The present invention comprises a machine for facilitating the finishing and like operations in connection with sand and other molds or patterns, having a part adapted to carry the mold, and which can be spun or rotated on an axis, which latter is adapted or enabled to assume and retain an oblique position, and in which suitable provision is made whereby during the operation of rotating the table on its inclined axis, the said axis maintains and retains its condition of obliquity without having to be held or retained in such position by the operator. The oblique axis is advantageously at right angles to the plane of the table or part adapted to carry the mold in such a manner that the plane of the table remains during the process of rotation in a fixed oblique plane occurring for instance at an angle of about 45° to the horizontal. The table being adapted or arranged to maintain and retain this angle of inclination of its axis, it can be rotated with the mold attached thereto and particularly valuable facilities are thereby afforded in connection with the finishing and like operations in connection with the mold or pattern, the advantage occurring by the fact that the mold member can be rotated upon an inclined axis of rotation. The arrangement may be such that the inclined axis is permanently fixed or provision may be made for adjusting the degree of inclination. Or provision may be made whereby the table can be displaced until its axis is vertical. In all instances however suitable means are incorporated whereby during the operation of rotating the table on its inclined axis, the said axis maintains and retains its condition of obliquity without having to be held or retained in such position by the operator.

In order that this invention may be clearly understood and readily carried into practice, reference may be had to the appended explanatory two sheets of drawings, upon which:—

Figure 1 illustrates one form of the present invention. Fig. 2 is a side elevation of Fig. 1 showing holes in the table for bolting on the mold. Fig. 3 is a sectional elevation illustrating another form of table and stand. Fig. 4 is a sectional side elevation of a modified form of the present invention. Fig. 5 is a front elevation of Fig. 4 illustrating the quadrant shaped slot and positions of table. Fig. 6 is a sectional elevation of the lever mechanism shown in Figs. 4 and 5. Fig. 7 is a section on the line $a$—$a$ of Fig. 6.

In a convenient embodiment of this invention a table 1 as shown in Figs. 1 and 2 is supported upon a suitable stand 2 by a swiveling connection 3, such table being arranged at an angle of about 45° so that as the table is rotated at such angle all parts present their surfaces in such a manner as to enable the facing material when dusted on to remain equally on all parts of the surface, and which also facilitates the process of smoothing which may be effected by the fingers which are preferably covered with thimbles of fine skins of india-rubber stretched thereon.

In Fig. 3 provision may be made whereby the table 1 can be turned and secured in a horizontal position for use when forming the mold and suitable means are provided for retaining the mold 4 on the table when in its tilted position, such for instance as projecting rods 20 which enter the ordinary holes in the lug projections 21 on the mold as shown in Fig. 4 or by having a raised flange or projection 5 on the table 1 within which the lower portion of the mold 4 fits as shown in Fig. 1.

In the case of the table 1 mounted to take both the horizontal and inclined positions as shown in Fig. 3 a suitable cast iron stand 2 may be provided of inverted U-shape to the one interior side 6 of which the lower end of a lever 7 is pivoted. The upper part of this lever is tubular and forms a bearing within which the spindle 8 of the table 1 is free to rotate, a slot 9 being formed in the one side of the top of the stand so as to enable the table to be turned on the pivot of the lever from the horizontal to the inclined position or vice versa as the case may be.

Instead of the pivot for the lever being in the position as shown in Fig. 3 it may be at the top of the cast iron stand 2 as shown in Figs. 4, 5 and 6 and for this purpose the sleeve 7' is provided at its center with a spindle 8' to which is secured the table 1

For this purpose the sleeve 7' is hollow and in order to hold the spindle 8' centrally thereof there is also provided a sleeve 10 in which the spindle is journaled, said sleeve 10 fitting inside of the sleeve 7'. If desired the spindle 8' may be held stationary with respect to the sleeve 10 by means of the bolt 8ª, see Fig. 7. On the table there is provided a boss 11 which acts as a bearing for the spindle 8' and rests upon the top of the sleeve 10. On one side of the sleeve 10 at its top is a projection 12 through which a rod or bar 13 may be passed in order to aid in turning or lifting the table 1 in the case for instance of a heavy mold. Around the sleeve 10 is a tubular trunnion 14 having at its upper end two projections 15 which pass through holes in the stand 2 thus forming the pivot for the movement of the table 1. At the lower extremity of the tubular trunnion 14 two pins 16 are fixed which enter quadrant shaped slots 17 in the stand; the parts of the pins which project through the quadrant shaped slots are furnished with winged nuts 18 in such a manner that upon the table 1 being tilted or its plane altered the pins 16 move up the slots 17 and the table can thus be fixed in any desired position by simply screwing the winged nuts 18. In order to raise the table and secure it in position if necessary one of the pivot projections 15 on the tubular trunnion 14 may be tapped to take a screw 19 in such a manner that by screwing it in it bears against the sleeve 10 thus securely holding it stationary, and therefore for raising the table the screw 19 has simply to be loosed and the sleeve lifted slightly and the screw then tightened again.

The arrangement of tilting and rotating the molds may be adapted for use in connection with any suitable form of molding machine, in which case in place of the stand the pivot attachment may be connected to any suitable part of the frame of the machine.

What I claim as my invention and desire to secure by Letters Patent is:—

1. In a molding machine, a support, an adjustably inclined shaft mounted in said support, means to lock said shaft in adjusted position, and a mold table carried by the shaft.

2. In a molding machine, a support, an inclined sleeve mounted on said support, a shaft journaled in said sleeve, and a mold table carried by the shaft, at right angles thereto.

3. In a molding machine, a support, a sleeve pivoted to said support and movable to varying angles with respect to said support, means to limit the movement of said sleeve, a shaft journaled in said sleeve, and a mold table carried by the shaft.

4. In a molding machine, a support, a sleeve pivoted to said support and movable to varying angles with respect to said support, means to limit the movement of said sleeve, means to lock said sleeve in adjusted position intermediate the limits of its movement, a shaft journaled in said sleeve, and a mold table carried by the shaft.

5. A machine for finishing sand molds comprising in combination, a rigid support, means provided thereon for carrying an inclined table at right angles thereto, said means consisting of an inclined rotatable axis centrally or substantially centrally engaging said table at substantially right angles to the table, and adjustable means adapted to retain said table and its complemental axis in an inclined position when rotated, substantially as described.

6. A machine for finishing sand molds comprising in combination, a rigid support, means provided thereon for rotatably carrying an inclined table at right angles thereto, said means consisting of an inclined rotatable axis centrally or substantially centrally engaging said table at substantially right angles to said table, and means adapted to retain said table and its complemental axis in an inclined position when rotated, substantially as described.

In witness whereof I have hereunto set my hand in the presence of two witnesses.

WILLIAM MILLS.

Witnesses:
 ARTHUR BROWN,
 HOLLIS BROWN.

Copies of this patent may be obtained for five cents each, by addressing the "Commissioner of Patents, Washington, D. C."